United States Patent [19]
Reck et al.

[11] Patent Number: 5,976,473
[45] Date of Patent: Nov. 2, 1999

[54] CATALYTIC CONVERTER CONFIGURATION WITH TWO OR MULTIPLE-LINE EXHAUST CONDUCTION

[75] Inventors: Alfred Reck, Kurten; Uwe Siepmann, Köln, both of Germany

[73] Assignee: EMITEC Gesellschaft fuer Emissionstechnologie mbH, Lohmar, Germany

[21] Appl. No.: 08/999,031

[22] Filed: Dec. 29, 1997

Related U.S. Application Data

[63] Continuation of application No. PCT/EP96/02139, May 17, 1996.

[30] Foreign Application Priority Data

Jun. 28, 1995 [DE] Germany ............................ 195 23 532

[51] Int. Cl.$^6$ .................................................. B01D 53/34
[52] U.S. Cl. ........................... 422/180; 422/177; 60/302; 60/323; 60/324
[58] Field of Search ..................................... 422/171, 177, 422/174, 180, 211, 222; 60/299, 300, 302, 323–324

[56] References Cited

U.S. PATENT DOCUMENTS

| 4,261,170 | 4/1981 | Suzuki | 422/180 |
| 5,365,735 | 11/1994 | Weber et al. | 60/323 |

FOREIGN PATENT DOCUMENTS

| 0 049 489 B1 | 6/1985 | European Pat. Off. . |
| 0 243 952 A1 | 11/1987 | European Pat. Off. . |
| 0 245 738 B1 | 8/1989 | European Pat. Off. . |
| 27 45 841 | 4/1979 | Germany . |
| 93 17 050 | 4/1995 | Germany . |
| 1-012017 | 1/1989 | Japan . |

*Primary Examiner*—Hien Tran
*Attorney, Agent, or Firm*—Herbert L. Lerner; Laurence A. Greenberg

[57] ABSTRACT

The catalytic converter configuration for exhaust systems of motor vehicles, in particular Otto engines, conducts the exhaust (at least in portions thereof) in two or more separate systems. Each system is provided with at least one catalytic converter with axial flow passages. The catalytic converters are combined into a shared monolith for the two systems which is provided with a partition at one or both of the end faces. The partition divides the cross section of the shell and it is positioned so close to the face of the honeycomb body as to be virtually seal-tight.

17 Claims, 3 Drawing Sheets

CATALYTIC CONVERTER CONFIGURATION WITH TWO OR MULTIPLE-LINE EXHAUST CONDUCTION

CROSS-REFERENCE TO RELATED APPLICATION

This is a continuation of copending international application PCT/EP96/02139, filed May 17, 1996, which designated the United States.

BACKGROUND OF THE INVENTION

Field of the Invention

The invention pertains to a catalytic converter configuration for exhaust systems in motor vehicles, especially those with internal combustion engines, in which the exhaust is conducted at least in partial areas of the exhaust apparatus in two or more separate systems, wherein one or more catalytic converter with axial passages are disposed in each system, and the catalytic converters are disposed in one shared shell.

Catalytic converters for the conversion of exhaust gases which comprise a honeycomb within a shell with a plurality of passages through which fluid can flow, are known for instance from European Patent EP-B-0 049 489. The honeycomb bodies preferably consist of layers of sheet metal, and at least some of the sheet metal layers are structured (e.g. corrugated). The sheet metal layers with their structures form the boundaries of passages capable of having a fluid flow through them.

A catalytic converter configuration for exhaust gases from motor vehicles is further known from European Patent EP 0 245 738 B1. There, the exhaust is carried through parts of the exhaust apparatus in two separate systems, and at least one catalytic converter with axial passages is provided in each system. These catalytic converters are arranged in one shared shell. EP 0 245 738 suggests the use to this end of honeycomb bodies which form independent segments within one shared shell. individual exhaust streams of an exhaust system can be allocated to individual segments by means of suitable piping. EP 0 245 738 B1 suggests, for the purpose of forming such a catalytic converter configuration, to construct the converter from individual honeycomb bodies which form a corresponding whole honeycomb body.

The individual segments have a shell with which additional structural walls are connected. The shells of the individual segments are connected with one another, thereby giving rise to a whole honeycomb.

The manufacture of such honeycomb bodies is relatively complex. In particular, the teaching of EP 0 245 738 reaches its limits where several exhaust streams are to be guided through the honeycomb body separately, while the installation volume remains limited, as the geometries of the individual segments become relatively complicated.

SUMMARY OF THE INVENTION

It is accordingly an object of the invention to provide a catalytic converter configuration with multiple-line exhaust conduction, which overcomes the above-mentioned disadvantages of the prior art devices and methods of this general type and which provides for simple manufacture and is suitable for the separate conduction of exhaust gases in individual exhaust streams of an exhaust system. A further objective is to reduce the manufacturing cost for a converter for such a catalytic converter configuration.

With the foregoing and other objects in view there is provided, in accordance with the invention, a catalytic converter configuration for exhaust systems in motor vehicles (particularly Otto engines), where an exhaust gas is conducted in two or more separate systems, comprising:

a catalytic converter honeycomb body having at least one end face and being formed with axial passages through which exhaust gas can flow;

a shell housing the honeycomb body, and at least one partition wall dividing a cross section of the shell adjacent to and substantially gas-tightly sealing against the at least one end face of the honeycomb body; and a structure forming a slit at the at least one end face of the honeycomb body, the partition wall protruding into the slit.

In accordance with an added feature of the invention, the partition wall is attached to the shell.

In accordance with an additional feature of the invention, there is provided a connecting flange attached to the shell for connecting the shell into the exhaust gas system. The second part of the partition wall is thereby directly attached to the connecting flange and extends diametrically within the connecting flange.

In accordance with another feature of the invention, the shell is formed with a connecting cone for connection into an exhaust gas pipe system, and wherein the partition wall is attached to and extends diametrically within the connecting cone.

In accordance with again another feature of the invention, the partition wall and the slit form a substantially gas tight sliding seat and form a division between the two separate systems of the exhaust system.

With the above and other objects in view there is also provided, in accordance with the invention, a similar catalytic converter configuration for exhaust systems, wherein the at least one partition wall has a first part secured directly at the honeycomb body and a second part sealingly engaging the first part with a sliding fit, and wherein the second part is attached to the shell.

In accordance with again an added feature of the invention, the honeycomb body is a metal honeycomb body formed of at least partially structured sheet metal layers defining the passages.

In accordance with again another feature of the invention, the first part of the partition includes at least one connecting element which projects into the honeycomb body.

In accordance with again an additional feature of the invention, a cross section of the connecting element(s) is such that the connecting element is in mechanical contact with the walls of the respective passage into which the connecting element is inserted.

In accordance with again a further feature of the invention, the connecting element is brazed to the honeycomb body.

In accordance with yet an added feature of the invention, the honeycomb body has a given axial length and is formed with a slot extending over only a part of the axial length, the first part of the partition wall protruding into the slot.

In accordance with yet another feature of the invention, the first part of the partition wall has a U-shaped cross section with a base and two arms connected to the base, whereby the base faces towards the honeycomb body.

In accordance with yet a further feature of the invention, the second part of the partition wall protrudes with a sliding seat between the arms of the first part of the partition wall.

In accordance with again another feature of the invention, both end faces of the honeycomb body are provided with a partition.

The honeycomb body may have a circular round or oval cross section. Other cross sections of the honeycomb body are also possible.

Finally, the at least one partition may be a double partition of mutually intersecting partition walls dividing the gas flow through the honeycomb body into four partial flows.

The basic feature of the invention is found in the fact that the multiple line exhaust system shares a single monolith. The partition is close enough to the face of the honeycomb body to form a substantially tight seal. The idea underlying this proposed solution is that the honeycomb body is formed with layers of structured sheet metal. At least part of the sheets extend along the entire axial length of the honeycomb body. These sheets divide the honeycomb body on a microscopic scale into individual passages through which fluid can flow. No additional partitions extending along the entire axial length of the honeycomb body are needed for the macroscopic division of the honeycomb body into at least two independent exhaust streams through which exhaust can flow without intermixing of the exhaust in the honeycomb body. To separate the flows of exhaust through the single honeycomb body, the converter is provided on at least one face of the honeycomb body with one or more partitions dividing the cross-section of the shell. By means of this partition, the hitherto separate flows of exhaust continue to be carried separately by the partition in the shell to the intake cross section of the honeycomb. The partition abuts close enough against the face of the honeycomb body to form a virtual seal. Any intermixing of the exhausts from the individual streams and pressure equalisation between the streams is avoided. This is of particular importance for the flow engineering design of the exhaust system with regard to the loading of the combustion chambers of the engine and its torque.

The fact that the catalytic converters form one single honeycomb body means that the hitherto known honeycomb bodies are taken to form the single honeycomb body of the catalytic converter configuration according to the invention. This suggestion has the advantage that the honeycomb body does not have to be built up from individual segments as in the prior art, but the already present, existing sub-division of the honeycomb body consisting of the layers of sheet metal can be made use of in co-ordination with the partition.

The tools used hitherto for the manufacture of such a honeycomb body can continue to be used. This means that manufacture is simplified and the manufacturing costs for a honeycomb body according to the invention are reduced.

The partition is preferably attached to the shell and protrudes into a slot on the face of the honeycomb body. The partition preferably runs diametrically in the connecting flange or connecting taper or cone. The slot in the face of the honeycomb body can, for instance, be formed by electrical spark erosion in the honeycomb body. The partition forms a sliding seat with the wall of the slot of the honeycomb body. To avoid any exchange of exhaust gases between the individual exhaust streams, the sliding seat should preferably be made virtually seal-tight. In ceramic honeycomb bodies which may undergo a certain shifting due to their bearing in a shell, the slot must be sufficiently wide to allow such shifting without damaging the honeycomb body. The seal-tight function should, however, be maintained as far as possible.

According to a further preferred enhancement, especially for metal honeycombs, it is suggested to build up the partition in two sections, whereby a first portion of the partition is attached to the honeycomb body itself and works together with a portion of the partition fixed to the shell or connecting flange in a seal-tight or almost seal-tight sliding seat manner. By means of this embodiment of the catalytic converter configuration, the varying temperature-dependent expansion of the components, especially the honeycomb body, is taken into account. By means of the sliding seat embodiment, no forces from the honeycomb body are inducted into the partition, nor are any forces from the shell or the connecting flange inducted into the honeycomb body.

For the connection of the first part of the partition, it is suggested to provide them with at least one connecting element, wherein the connecting element at least partially protrudes into the honeycomb body. The connecting element preferably has a cross section and/or a shape designed such that each connecting element has mechanical contact with the walls of selected and/or any passages when pushed into them. For permanent connection of the connecting elements with the honeycomb body, it is convenient to braze them together.

According to a further suggestion, the device has at least one partition forming a continuous line, wherein the surface area contained in the continuous line is smaller than the area of the inlet cross section or outlet cross section of the honeycomb body respectively. A continuous line is preferred which is circular in shape.

Instead of or in addition to the connecting elements, the first portion of the partition may be connected to the honeycomb body in that the latter is formed with a slot extending over at least a part of the axial length of the honeycomb body. The partition projects into the slot.

One exhaust flow stream is conducted to each chamber via a separate feed pipe. The individual exhaust flows can be carried by separate pipes. This is not absolutely necessary, however. The partition preferably has a first portion with a U-shaped cross section with a base and two arms connected to the base. The partition with a U-shaped cross section is connected with the honeycomb body in such a way that the base of the partition faces the honeycomb body. The bars protrude counter to the direction of flow of one exhaust stream at the inlet. The second portion of the partition is inserted between the bars in a sliding seat manner. By this means, any different expansion behavior due to temperature expansion is evened out and at the same time, a good sealing result is achieved.

As noted above, the partitions are preferably formed on both faces of the honeycomb body. As also indicated above, the present invention is not limited only to catalytic converter configurations with a metal honeycomb body; ceramic honeycomb bodies can be used as well in certain embodiments.

Other features which are considered as characteristic for the invention are set forth in the appended claims.

Although the invention is illustrated and described herein as embodied in a catalytic converter configuration with two or multiple-line exhaust conduction, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
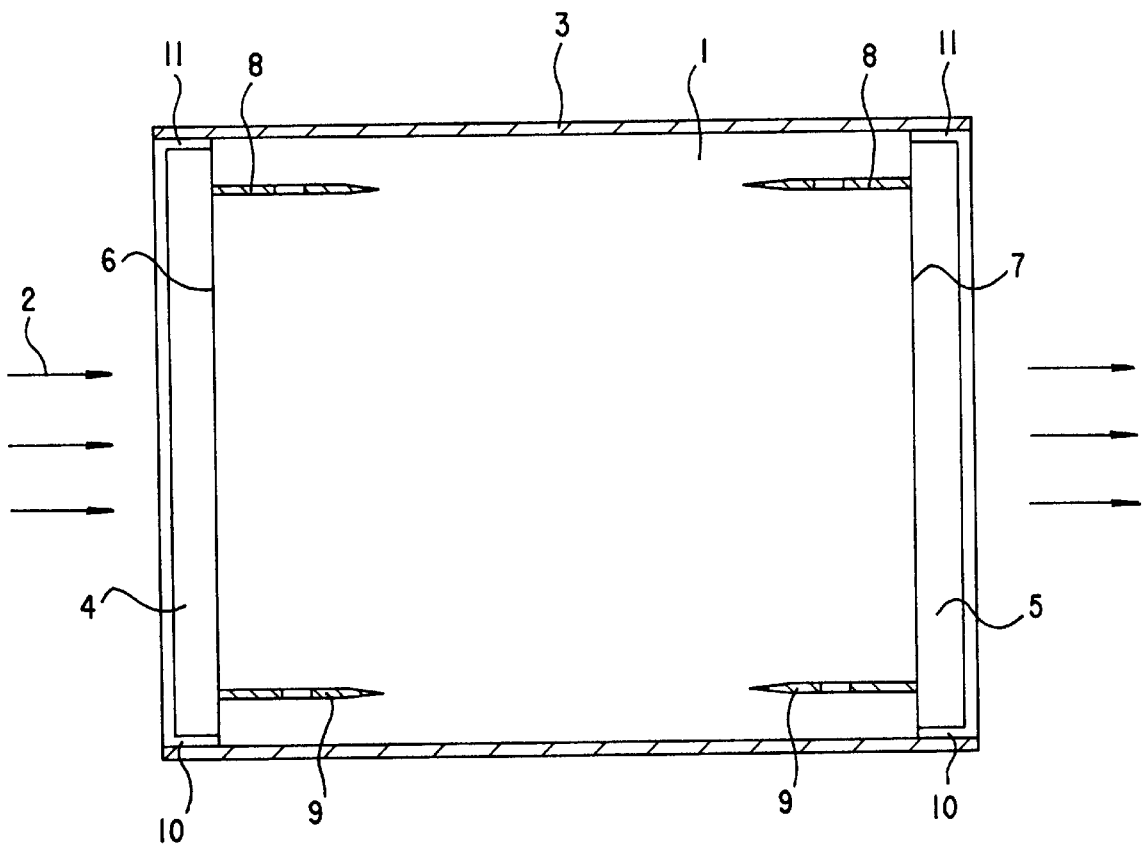
FIG. 1 is a longitudinal sectional view of a first embodiment of a honeycomb body.
Figure 2:
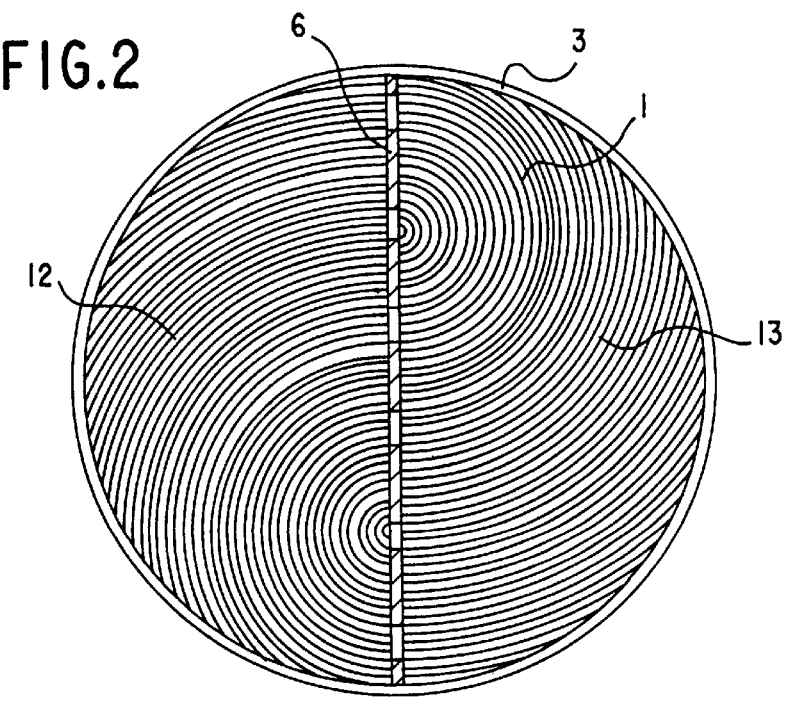
FIG. 2 is a left side elevational view of the honeycomb body according to FIG. 1.

Referring now to the drawing figures in detail and first, more specifically, to FIGS. 1 and 2 thereof, there is seen a first embodiment of a honeycomb body 1. The honeycomb body 1 is, as can be seen from FIG. 2, wound in an S-shape and the honeycomb body (the metallic monolith) is housed in a shell 3 (commonly referred to as the honeycomb housing or jacket 3). A first portion 6 of a partition 21 is disposed at an inlet 4 and a first portion 7 of a partition 23 is disposed at an outlet 5 of the honeycomb body 1. The first portions 6, 7 extend in a radial plane of the honeycomb body 1, whereby the winding axes about which the honeycomb body 1 is wound, are covered over.

Both the first portion 6 at the inlet 4 and the first portion 7 at the outlet 5 of the honeycomb body 1 are immediately adjacent to and contact the honeycomb body 1. Two connecting elements 8, 9 are disposed on each of the two portions 6, 7 respectively for connecting the first portions 6, 7, of the partition to the honeycomb body 1. The connecting elements 8, 9 protrude into the honeycomb body 1. As can be seen in particular from FIG. 1, a gap 10, 11 is formed between the shell 3 and first portion 6 or 7 respectively, which allows radial expansion of the first portion 6, 7. The shell 3 is formed with connecting flanges or connecting cones just outside the gaps 10 and 11, for connection with exhaust gas system piping. The arrows and the associated reference numeral 2 indicate a flow direction of the gas through the catalyst honeycomb. The first portion 6 and the first portion 7 lie in a shared plane. They divide the honeycomb body 1 macroscopically into two chambers 12, 13, through which exhaust can flow independently of one another.

Figure 3:
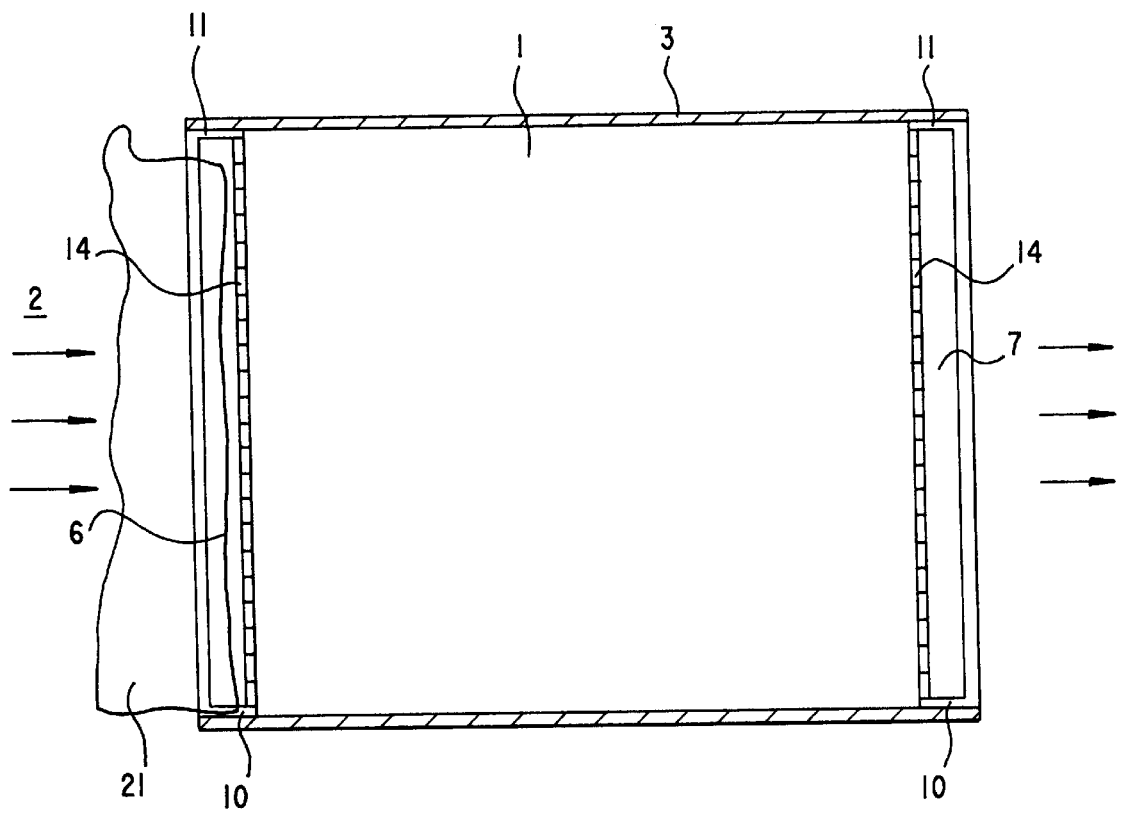
FIG. 3 is a sectional view of a second embodiment of a honeycomb body.
Figure 4:
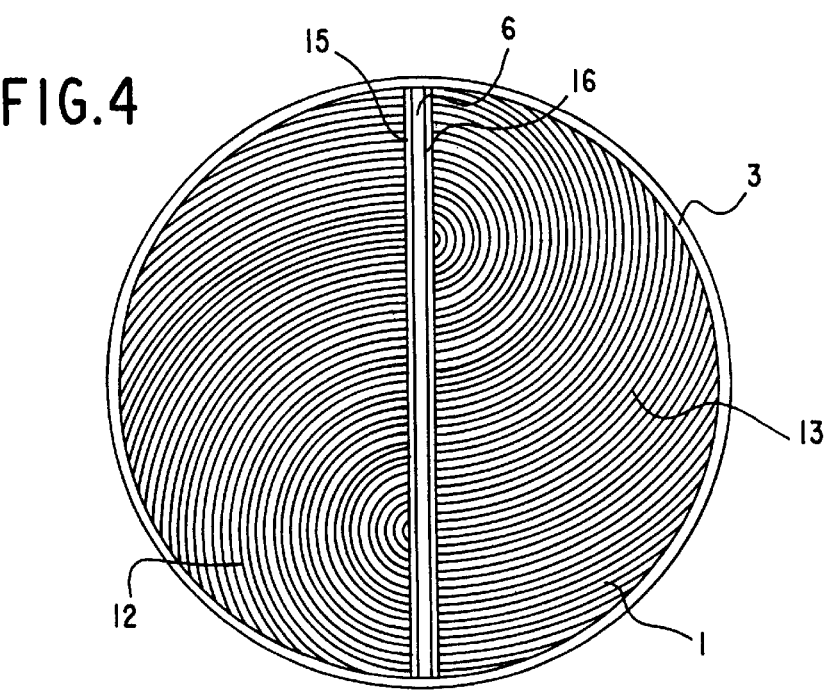
FIG. 4 is a left side elevational view thereof.

FIGS. 3 and 4 show a second embodiment of the novel system. The second embodiment differs from the first embodiment shown in FIGS. 1 and 2 in that the first portions 6 and 7 are U-shaped in section. The first portions 6 and 7 each has a base 14 which is directly adjacent to and contacts the honeycomb body 1. Two arms 15 and 16 extend from the base 14, formed with a space between them. A second portion 24 of the partition 21 protrudes between the arms 15 and 16. The arms 15 and 16 and the second portion wall 24 thus partially overlap, so that differences in the thermal expansion of the components in the configuration can be compensated.

Figure 5:
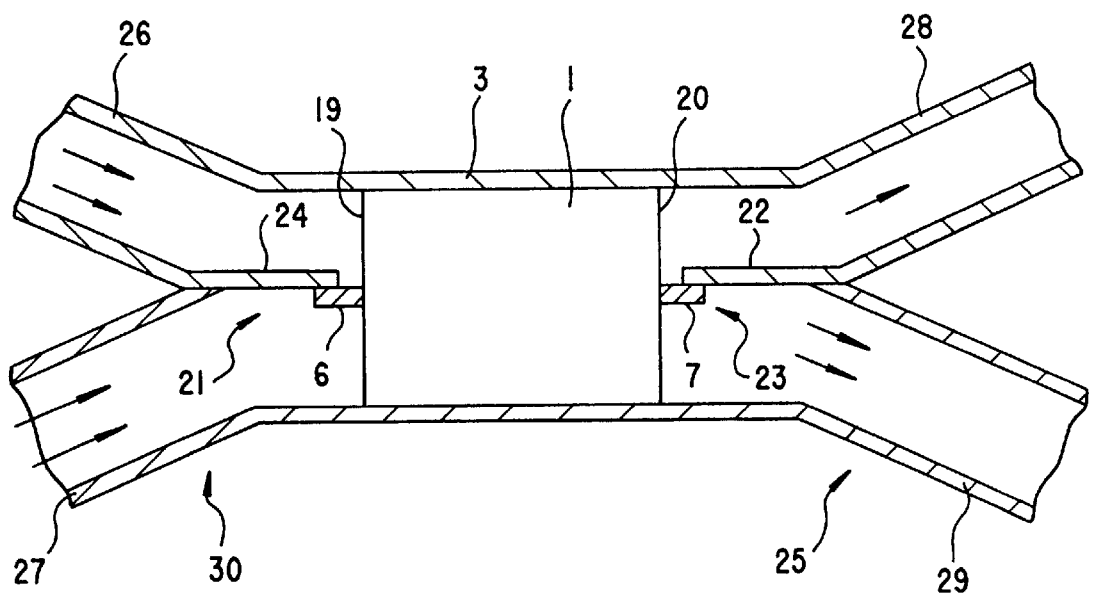
FIG. 5 is a partial sectional, schematic view of a catalytic converter configuration.

FIG. 5 is a schematic of a catalytic converter configuration in section. The catalytic converter configuration for exhaust systems in motor vehicles, especially for internal combustion engines, comprises the honeycomb body 1, which is arranged in the shell 3. The shell 3 is formed with connecting flanges or connecting tapers (cones) at which two connecting pieces 30 and 25 are joined to the shell 3. Each of the connection pieces 30 and 25 is connected to two pipes 26, 27 or 28, 29 respectively. In each of the connecting pieces 30 and 25, there is a partition 21, 23. The first portion 6 of the partition 21 is positioned on an end face 19 of the honeycomb body 1. The first portion 6 of the partition 21 forms a sliding seat with the second portion 24 of the partition 21. The exhaust fed into the honeycomb body 1 via pipes 26 and 27 and the second portion 24 flows through the honeycomb body 1 and flows out of the honeycomb body 1 at the outlet end face 20. At the outlet of the honeycomb body 1, the first portion 7 of a partition 23 is disposed on the outlet face. The partition 23 further has a second portion 22 which is arranged with a sliding seat on the first portion 7. The sliding seats are virtually gas-tight. A similarly efficient gas isolation between the two channel segments is achieved according to the embodiment illustrated in FIGS. 3 and 4, where the second portion 24 of the inlet partition arms 21 meshes into the U-shape of the first portion 6 (with the arms 15, 16), and the second portion 22 of the partition 23 meshes into the U-shape of the outlet partition 23 between the arms 15 and 16.

We claim:

1. A catalytic converter configuration for exhaust systems in motor vehicles, where an exhaust gas is conducted in two separate systems, comprising:

a catalytic converter honeycomb body having an end face and being formed with axial passages through which exhaust gas can flow;

a shell housing said honeycomb body, said shell being formed with a first connecting piece receiving a first flow of exhaust gas from an internal combustion engine and with a second connecting piece receiving a second flow of exhaust gas from the internal combustion engine, and at least one partition wall dividing said shell from said first and second connecting pieces to said end face and substantially gas-tightly sealing against said end face of said honeycomb body; and a structure forming a slit at said at least one end face of said honeycomb body, said at least one partition wall protruding into said slit without being fixed to said honeycomb body, said at least one partition wall and said slit forming a substantially gas tight sliding seat and a division between two separate systems of an exhaust system.

2. The catalytic converter configuration according to claim 1, wherein said partition wall is attached to said shell.

3. The catalytic converter configuration according to claim 1, which further comprises a connecting flange attached to said shell for connecting said shell into the exhaust gas system, and wherein said at least one partition wall has a portion directly attached to said connecting flange and extending diametrically within said connecting flange.

4. The catalytic converter configuration according to claim 2, wherein said shell is formed with a connecting cone for connection into an exhaust gas pipe system, and wherein said partition wall is attached to and extends diametrically within said connecting cone.

5. A catalytic converter configuration for exhaust systems in motor vehicles, where an exhaust gas is conducted in two separate systems, comprising:

a catalytic converter honeycomb body having at least one end face and being formed with axial passages through which exhaust gas can flow;

a shell housing said honeycomb body, and at least one partition wall dividing a cross section of said shell adjacent to and substantially gas-tightly sealing against said at least one end face of said honeycomb body; said at least one partition wall having a first part secured directly at said honeycomb body and a second part sealingly engaging said first part with a sliding seat, and wherein said second part is attached to said shell.

6. The catalytic converter configuration according to claim 5, which further comprises a connecting flange attached to said shell for connecting said shell into the exhaust gas system, and wherein said second part of said partition wall is directly attached to said connecting flange.

7. The catalytic converter configuration according to claim 5, wherein said honeycomb body is a metal honeycomb body formed of at least partially structured sheet metal layers defining the passages.

8. The catalytic converter configuration according to claim 5, wherein said first part of said at least one partition wall includes at least one connecting element which projects into said honeycomb body.

9. The catalytic converter configuration according to claim 8, wherein said axial passages in said honeycomb body have walls defining a given cross-sectional shape thereof, and a cross section of said at least one connecting element being such that said at least one connecting element is in mechanical contact with the walls of the respective passage into which said connecting element is inserted.

10. The catalytic converter configuration according to claim 8, wherein said at least one connecting element is brazed to said honeycomb body.

11. The catalytic converter configuration according to claim 5, wherein said honeycomb body has a given axial length and is formed with a slot extending over only a part of the axial length, said first part of said partition wall protruding into said slot.

12. The catalytic converter configuration according to claim 5, wherein said first part of said partition wall has a U-shaped cross section with a base and two arms connected to said base, whereby an opening defined by said U-shaped cross section faces away from said honeycomb body.

13. The catalytic converter configuration according to claim 12, wherein said second part of said partition wall protrudes between said two arms of said first part of said partition wall to form said sliding seat.

14. The catalytic converter configuration according to claim 5, wherein said at least one partition wall comprises two partition walls and said at least one end face comprises two end faces, one of said two partition walls being disposed at a first of said two end faces and the other of said two partition walls being disposed at a second of said two end faces.

15. The catalytic converter configuration according to claim 5, wherein said honeycomb body has a circular cross section.

16. The catalytic converter configuration according to claim 5, wherein said honeycomb body has an oval cross section.

17. The catalytic converter configuration according to claim 5, wherein said at least one partition wall is a double partition wall dividing a gas flow through said honeycomb body into four partial flows.

* * * * *